(12) United States Patent
Briglia et al.

(10) Patent No.: US 9,234,698 B2
(45) Date of Patent: Jan. 12, 2016

(54) PROCESS AND APPARATUS FOR DRYING AND COMPRESSING A $CO_2$-RICH STREAM

(75) Inventors: Alain Briglia, Houston, TX (US);
Philippe Court, Houston, TX (US);
Arthur Darde, Paris (FR)

(73) Assignee: L'Air Liquide Société Anonyme Pour L'Étude Et L'Exploitation Des Procedes Georges Claude, Paris (FR)

( * ) Notice: Subject to any disclaimer, the term of this patent is extended or adjusted under 35 U.S.C. 154(b) by 439 days.

(21) Appl. No.: 13/703,441

(22) PCT Filed: Jun. 10, 2011

(86) PCT No.: PCT/EP2011/059724
§ 371 (c)(1),
(2), (4) Date: Feb. 26, 2013

(87) PCT Pub. No.: WO2011/154536
PCT Pub. Date: Dec. 15, 2011

(65) Prior Publication Data
US 2013/0160488 A1    Jun. 27, 2013

(30) Foreign Application Priority Data

Jun. 11, 2010    (FR) ..................................... 10 54640

(51) Int. Cl.
*B01D 53/14*    (2006.01)
*F25J 3/02*    (2006.01)
*B01D 53/26*    (2006.01)

(52) U.S. Cl.
CPC ............. *F25J 3/0266* (2013.01); *B01D 53/263* (2013.01); *B01D 53/265* (2013.01); *B01D 2256/22* (2013.01); *B01D 2257/302* (2013.01); *B01D 2257/404* (2013.01)

(58) Field of Classification Search
None
See application file for complete search history.

(56) References Cited

U.S. PATENT DOCUMENTS 3,881,994 A * 5/1975 Fickel ........................... 202/160
4,302,220 A * 11/1981 Volkamer et al. ............... 95/166
(Continued)

FOREIGN PATENT DOCUMENTS

FR    2918579    1/2009
WO    WO 2009127217    10/2009

OTHER PUBLICATIONS

PCT/EP2011/059724, International Search Report, Sep. 23, 2011.

*Primary Examiner* — Duane Smith
*Assistant Examiner* — Phillip Shao
(74) *Attorney, Agent, or Firm* — Justin K. Murray

(57) ABSTRACT

A process for compressing a CO2-rich fluid containing water. The CO2-rich fluid is compressed in a compressor; upstream of the compression step, an antifreeze is mixed with the CO2-rich fluid containing water. The CO2-rich fluid containing antifreeze is cooled, water is separated from the cooled fluid and the water-depleted cooled fluid is compressed in the compressor, wherein the CO2-rich fluid containing water is sent to a scrubbing column fed, preferably at the top, with a water/antifreeze mixture, where it cools and is separated from the water, the water-depleted cooled fluid is extracted from the top of the column; a water/antifreeze mixture in the column is extracted at a level below the top; the mixture is cooled using the refrigeration from an apparatus for cooling and/or purifying the cooled fluid compressed in the compressor and the fluid is returned to the top of the column.

13 Claims, 3 Drawing Sheets

(56) References Cited

U.S. PATENT DOCUMENTS

| | | | |
|---|---|---|---|
| 4,478,612 A | 10/1984 | Diaz et al. | |
| 4,498,911 A * | 2/1985 | Deal et al. | 95/176 |
| 4,599,096 A | 7/1986 | Burr | |
| 6,461,413 B1 * | 10/2002 | Landreau et al. | 95/161 |
| 2003/0045756 A1 | 3/2003 | Mimura | |
| 2010/0206165 A1 | 8/2010 | Alban et al. | |
| 2012/0272680 A1 * | 11/2012 | Briglia et al. | 62/617 |
| 2012/0279394 A1 * | 11/2012 | Menzel | 95/179 |

\* cited by examiner (Prior Art)

US 9,234,698 B2

PROCESS AND APPARATUS FOR DRYING AND COMPRESSING A $CO_2$-RICH STREAM

CROSS-REFERENCE TO RELATED APPLICATIONS

This application is a §371 of International PCT Application PCT/EP2011/059721, filed Jun. 10, 2011, which claims §119(a) foreign priority to French patent application 1054640, filed Jun. 11, 2010.

1. Field Of The Invention

The present invention relates to a process and to a unit for drying and compressing a $CO_2$-rich stream.

2. Summary of the Invention

The compression of $CO_2$-rich and wet streams requires the use of a compressor made of stainless steel—or even made of materials that are more noble still, such as steels that have a high nickel content—in order to prevent corrosion by carbonic acid, or by other stronger acids that might result from the presence of impurities in the $CO_2$-rich stream, such as nitrogen oxides or sulfur oxides.

A $CO_2$-rich fluid contains between 1 mol % and 100 mol % of $CO_2$ on a dry basis, preferably between 30 mol % and 100 mol % of $CO_2$ on a dry basis. Ambient air is 25 times more depleted in $CO_2$ than the bottom limit of 1 mol %.

It is in this way that the prior art for the treatment of such $CO_2$-rich streams is schematically represented, as in FIG. 1.

1=provision of the $CO_2$-rich stream (examples: outlet of a column for regenerating a solvent (amine type) or oxy-combustion flue gases after a primary filter of electrostatic or bag filter type)

3=optional step of fine purification (to a typical level of the order of 1 part per million) of sulfur-containing elements 5=compression in a compressor, the materials of which in contact with the wet gas are made of corrosion-resistant steel 7=drying of the gas by adsorption (for example adsorbent of activated alumina, molecular sieve or silica gel type)

9=optionally purifying the $CO_2$-rich gas of its light constituents (oxygen, argon, hydrogen, carbon monoxide, nitrogen, etc.) and/or of its heavier constituents ($NO_2$, $N_2O_4$, $SO_2$, etc.), the possible variants of this step are described at length in previous patent applications 11=step of compression of the $CO_2$-rich final product or of liquefaction of the $CO_2$-rich final product in order to make it available to a system of transport (by pipeline or boat) or for its use in a process.

FR-A-2918579 and U.S. Pat. No. 4,478,612 respectively describe the subjects of the preambles of claims 1 and 8.

Optionally, according to the invention:

The compressor is made of carbon steel or low-alloy steel.

In order to extract a portion of the water from the wet fluid, the fluid is cooled until a mixture comprising, inter alia, water and antifreeze condenses, a water-depleted gas stream containing a similar amount of antifreeze, and a liquid stream that is enriched, relative to the initial fluid, in water and in antifreeze, are produced.

Downstream of the compressor, the compressed fluid is separated at a temperature below 0° C., and preferably below −10° C. without having dried it by adsorption before cooling it below 0° C.

Water-rich and antifreeze-rich condensates are recovered during the separation at a temperature below 0° C. and preferably below −10° C., and the antifreeze is recycled upstream of the cooling step after extraction of the condensates.

The $CO_2$-rich fluid contains less than 100 ppm vol, even less than 2000 ppm vol or even less than 20 000 ppm vol (by volume) of sulfur oxides.

The means for extracting water from the cooled fluid may consist of a phase separator.

The present invention aims to considerably reduce the cost of the compression unit 5 and optional purification unit 3 of the $CO_2$-rich stream by removing enough water upstream of the compression step 5 to avoid the condensation thereof during the successive compression and cooling phases in the compressor, which enables the use of carbon steel or low-alloy steel instead of stainless steel.

A second aspect of the invention consists in reducing the cost of the drying unit 7 when purification by partial condensation and optional distillation is desired in order to improve the composition of the $CO_2$ produced. The main role of this unit is to remove enough water from the $CO_2$-rich stream to prevent this water from freezing during the cooling in the unit 9. Residual water contents of the order of one part per million may thus be necessary to prevent freezing at −56° C., a minimum temperature due to the solidification of $CO_2$.

Firstly, it will be considered how to do without the drying unit, while cooling the $CO_2$-rich stream to around −55° C..

The invention consists in injecting an antifreeze—methanol for example—in a sufficient amount so that the solidification point of the water is below the coldest temperature of the unit 9 (for example for a water solidification point of −54° C., it is necessary to inject at least 1 kg of methanol, per 1 kg of water contained in the gas) then in cooling the mixture to the desired temperature.

An improvement consists in cooling the antifreeze-containing gas to an intermediate temperature, obviously above the desired final temperature, so that a significant fraction of the water, and of the antifreeze contained is condensed and thus recycled, limiting the consumption of the antifreeze. The colder the temperature reached, the greater the condensation of the water. The gas resulting from this intermediate condensation is then cooled to the temperatures desired for the remainder of the process where another condensation of water and of antifreeze takes place.

It is possible to envisage a second injection of antifreeze after this first condensation, depending on the resulting fractions of water and antifreeze in the gas phase. The advantage of a multiple injection will be to reduce the total amount to be injected since each injection will be adapted to the condensation that follows. However, since the system becomes more complex, a technico-economic study will assess the advantage of multiplying the injections of antifreeze.

A similar approach makes it possible to remove enough water before the compression to use a compressor made of carbon steel or low-alloy steel. It is therefore a question of cooling the $CO_2$-rich stream until the remaining fraction of water ensures that the dew point will never be reached in the various compression and cooling stages of the compressor. Thus, cooling of a stream containing around 90% of $CO_2$ by volume and on a dry basis to −15° C. and 0.9 bar absolute makes it possible to lower the dew point at the outlet of the compressor (20 bar absolute in our example) to less than 30° C., i.e. a temperature for which it is possible to easily ensure that it will not be reached during interstage coolings and at the outlet of the compressor. A control of the temperature of the compressed stream by regulation of the flow rate of cooling water as a function of the temperature of the gas at the outlet of the cooler is one example that makes it possible to keep the compressed stream above the dew point and therefore the corrosion zone.

Compared to the existing process, it is therefore necessary to add means for injecting an antifreeze into the $CO_2$-rich stream, and also advanced cooling means in order to reach temperatures of the order of −15° C. at low pressure (in general a pressure close to atmospheric pressure).

The advantages of this invention are numerous:

The compressor and the interstage coolers are therefore made of carbon steel or low-alloy steel.

The suction temperature is significantly lowered compared to the prior art: between a suction at 20° C. and a suction at −15° C., the volume flow rate—and therefore the size of the first compression impeller, which defines the size of the compressor, decreases by 7% if a pressure drop of 100 mbar is considered for the cooling (from 1 bar absolute to 0.9 bar a). This results in an investment saving for the machine.

The suction temperature is stabilized over the year, which makes it possible to operate exactly under the design conditions and therefore to improve the mean efficiency of the machine.

The compressor should not be sized for a high suction temperature which will only be encountered for a few days in the year.

The compression power is significantly reduced, both due to the absence of most of the water molecules and by the colder suction.

The compressor acts as a very efficient mixer for the antifreeze in the gas to be treated. This is of prime importance upstream of the purification unit 9, since the residual water content is very low (of the order of a few hundreds of parts per million), the amount of antifreeze to be injected is also very low, which makes the injection of the antifreeze very complicated, since it is necessary to ensure that the mixing is very homogeneous (antifreeze in the gas).

Specifically it is found that the fraction of antifreeze remaining in the vapor phase is substantially the same as the fraction of water and thus ensures that the intermediate injections of antifreeze are superfluous.

Costly adsorption-drying equipment is avoided.

The energy penalty of the regeneration of the adsorption unit is avoided.

Another variant of the invention consists in considering that in the absence of water, sulfur oxides and nitrogen oxides will not condense in acid form. As regards nitric acid, since its dew point is close to that of water, the situation does not change, as a first approximation, whether they are considered or not. As regards sulfuric acid, its dew point varies between 70° C. and 150° C. approximately depending on the pressures and concentrations considered.

The invention makes it possible to not purify the $CO_2$-rich stream of sulfur oxide before the compression. The sulfur oxides will then be either separated by scrubbing with a basic liquid in the water separation column described further on, separated at high pressure, by distillation for example, or co-sequestered with the $CO_2$ if this is the chosen application for the $CO_2$.

The saving for a unit that produces $CO_2$-rich gas may be considerable if a coal-fired power plant is considered where it could become possible to envisage not removing the $SO_2$ from the stream that will be extracted for sequestration.

It remains to mention the antifreeze cycle. Most of the antifreeze will be condensed with the water, and also other impurities of the $CO_2$-rich stream. Regeneration of the antifreeze is possible by using a gas/liquid contactor that will use a portion of the $CO_2$-rich gas taken before any injection of antifreeze. The contactor will make it possible to recover almost all of the antifreeze. The gas is then mixed with the remainder of the $CO_2$-rich gas, thus reducing the make-up of antifreeze to the extremely reduced fractions remaining in the product and in the condensates.

The condensates may be sent to the boiler, if there is a boiler, for destruction of the traces of antifreeze.

Finally, the traces of antifreeze and of water remaining in the $CO_2$-rich product should not hamper the sequestration of the latter, nor even the use thereof for enhanced oil recovery. It should however be noted that, close to the critical point of $CO_2$ (74 bar absolute and 31.1° C.), the antifreezes (in general alcohols, and especially methanol) and water form liquid phases independent of the $CO_2$ which may be either liquid or gaseous. A recovery of an additional fraction of antifreeze, accompanying an improvement in the purity of the $CO_2$ produced, can therefore be envisaged.

According to one subject of the invention, a process is provided for compressing a water-containing $CO_2$-rich fluid in which the $CO_2$-rich fluid is compressed in a compressor, upstream of the compression step, an antifreeze is mixed with the water-containing $CO_2$-rich fluid, the antifreeze-containing $CO_2$-rich fluid is cooled, water is separated from the cooled fluid and the water-depleted cooled fluid is compressed in the compressor, characterized in that the water-containing $CO_2$-rich fluid is sent to a scrubbing column fed, preferably at the top, by a mixture of water and antifreeze where the fluid is cooled and is separated from water and the water-depleted cooled fluid is extracted at the top of the scrubbing column, a mixture of water and antifreeze is extracted from the scrubbing column at a level below the top, the mixture is cooled, using refrigeration originating from a unit for cooling and/or purifying the fluid cooled and compressed in the compressor, and the mixture is sent back to the top of the column.

According to other optional subjects:

The compressor is made of carbon steel or low-alloy steel.

Downstream of the compressor, the compressed fluid is separated at a temperature below the solidification point of water without having dried it by adsorption upstream, therefore below 0° C. at ambient pressure, preferably below −10° C.

The content of water and/or of other impurities of the mixture extracted from the scrubbing column is reduced, before sending it back to the top of the column.

The mixture is purified by distillation in a purification column having a bottom reboiler, a liquid containing water and antifreeze is extracted from the bottom of the purification column and the rate of reboiling is adjusted as a function of the content of antifreeze in the mixture feeding a cooling section of the scrubbing column or in the liquid extracted at the bottom of the purification column.

The mixture is purified by adsorption or by permeation or pervaporation or vacuum drawing.

The mixture of water and antifreeze, for example methanol, is cooled using refrigeration originating from a unit for cooling and/or purifying the fluid cooled and compressed in the compressor using, for example, at least one of the following steps:

i) vaporization of $CO_2$ originating from a compressor for producing $CO_2$ treated by the cooling and/or purifying unit;

ii) production of refrigeration by a refrigeration unit that cools the $CO_2$-rich fluid or the water-depleted cooled fluid or a fluid derived from one of these fluids or a fluid from which one of these fluids is derived;

iii) use of the refrigeration produced by the expansion of the water-depleted cooled fluid, for example in the context of a solid cryocondensation or an anti-sublimation.

According to another subject of the invention, a unit is provided for treating a water-containing $CO_2$-rich fluid comprising a column for scrubbing the $CO_2$-rich fluid, an inlet line for a mixture of antifreeze and water which is connected to an upper level of the column, an inlet line for the water-containing $CO_2$-rich fluid connected to a lower level of the column, a line for extracting water from the bottom of the column, a line for withdrawing a mixture of water and antifreeze from the column connected to an intermediate level of the column, characterized in that it comprises a compressor, and means for sending the cooled fluid that is purified of water to the compressor, cooling means connected to the line for withdrawing the mixture and the inlet line for the mixture, which are suitable for recovering the refrigeration originating from a unit for cooling and/or purifying the fluid cooled and compressed in the compressor, and a line for sending the cooled liquid or a liquid derived from the cooled liquid to the top of the column.

According to other optional subjects, the unit comprises:

Purification means, other than the scrubbing column, connected to the line for withdrawing the mixture and the line for sending a liquid derived from the cooled liquid to the top of the column.

The compressor is made of carbon steel or low-alloy steel.

The unit comprises means for vaporizing $CO_2$ originating from a compressor for producing $CO_2$ treated in the cooling and/or purifying unit that are suitable for transferring refrigeration to the means for cooling the mixture in order to cool the mixture.

The unit comprises a refrigeration unit capable of cooling the $CO_2$-rich fluid or the water-depleted cooled fluid or a fluid derived from one of these fluids or a fluid from which one of these fluids is derived and capable of cooling the mixture.

The unit comprises means for expanding the water-depleted cooled fluid where the cooling unit is a solid cryocondensation or anti-sublimation unit and means for transferring refrigeration from the means for expanding the cooled fluid to the means for cooling the mixture.

The water-depleted cooled fluid compressed in the compressor may be cooled and then treated by scrubbing in order to remove impurities, such as NOx, methanol or water in order to produce an impurity-enriched liquid and a purified gas.

In order to produce the refrigeration for cooling the mixture, it is possible:

To use a compressor of $CO_2$ purified in the unit or acting as refrigeration cycle, the advantage is in using one piece of equipment for several functions.

To use an existing refrigeration unit in the process (upstream or downstream) (aqueous ammonia or other).

To use refrigeration produced by the expansion of the treated fluid, for example in the context of "solid cryo-condensation" or "anti-sublimation".

Optionally, provision may be made for the degassing and recycling to the $CO_2$-rich stream of the condensed antifreeze, with the optional water entrained after the cooling column during the steps of compression and cooling of the stream 55, and also of the antifreeze entrained with the water purge 43 by bringing into contact with the $CO_2$-rich stream upstream of the cooling operation under a temperature of 0° C..

Optionally, it is possible to connect, in parallel, n (n≥1) sections for degassing of the antifreeze in order to increase the liquid reflux, the liquid stream passing successively into these various sections with intermediate pumping, the gas stream being distributed equally between the various sections.

Optionally, it is possible to use at least one section of gauze packing enabling low reflux rates in a section with packing for the degassing of the methanol (section C and D).

Provision may be made for the extraction of condensates rich in antifreeze (methanol for example) and water in the cryogenic unit and recycling of the antifreeze as described above.

The process is compatible with $SO_2$ contents<100 ppm vol, even with $SO_2$ contents<2000 ppm vol, or with $SO_2$ contents<20 000 ppm vol in the $CO_2$-rich fluid.

After the compression of the water-depleted fluid, it is possible to cool and condense the fluid. In this case, and in the presence of compounds capable of reacting with methanol, such as NOx for example, it is recommended to dilute the pressurized fluid originating from the compression before the condensation with (fluid 64 in the figures):

water and/or antifreeze, for example methanol and/or liquid $CO_2$.

It can be envisaged to recycle at least one portion of the condensate produced by the condensation of the fluid to the scrubbing column. Since the condensate is rich in methanol and optionally NOx, it can be used for the neutralization of SOx according to the known oxidation reactions of $SO_2$ to $SO_3$ by $NO_2$, making it possible to remove the $SO_3$ with water in the form of sulfuric acid.

In other words, a portion of the condensate may be sent to a boiler.

According to another subject of the invention, a unit is provided for compressing a water-containing $CO_2$-rich fluid comprising a compressor, characterized in that it comprises, upstream of the compressor, a column for scrubbing the $CO_2$-rich fluid, an inlet line for a mixture of mixed antifreeze and water which is connected to an upper level of the column, an inlet line for the water-containing $CO_2$-rich fluid connected to a lower level of the column, a line for extracting water from the bottom of the column, a line for withdrawing a mixture of water and antifreeze from the column connected to an intermediate level of the column, cooling means connected to the line for withdrawing the mixture and the inlet line for the mixture, and optionally purification means, other than the scrubbing column, connected to the line for withdrawing the mixture and the inlet line for the mixture, and means for sending the cooled fluid that is purified of water to the compressor.

Optionally the compressor is made of carbon steel or low-alloy steel.

BRIEF DESCRIPTION OF THE FIGURES

The invention will be described in greater detail with reference to the figures.

DETAILED DESCRIPTION OF THE INVENTION

Figure 1:
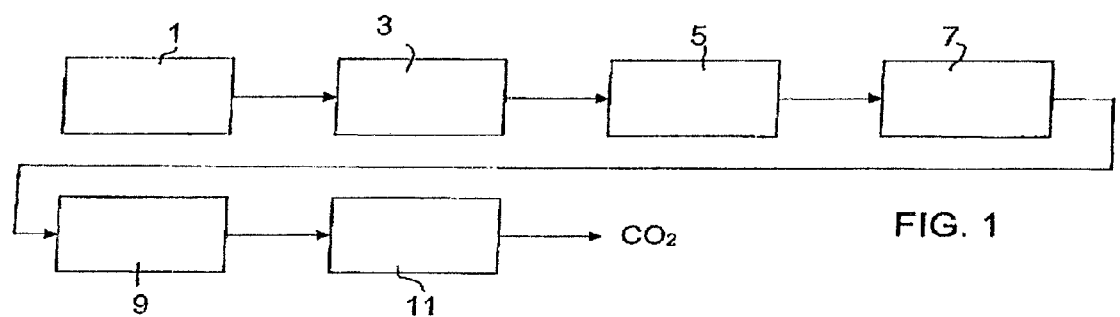
FIG. 1 represents an embodiment of the prior art and FIGS. 2 and 3 illustrate processes according to embodiments of the invention.
Figure 2:
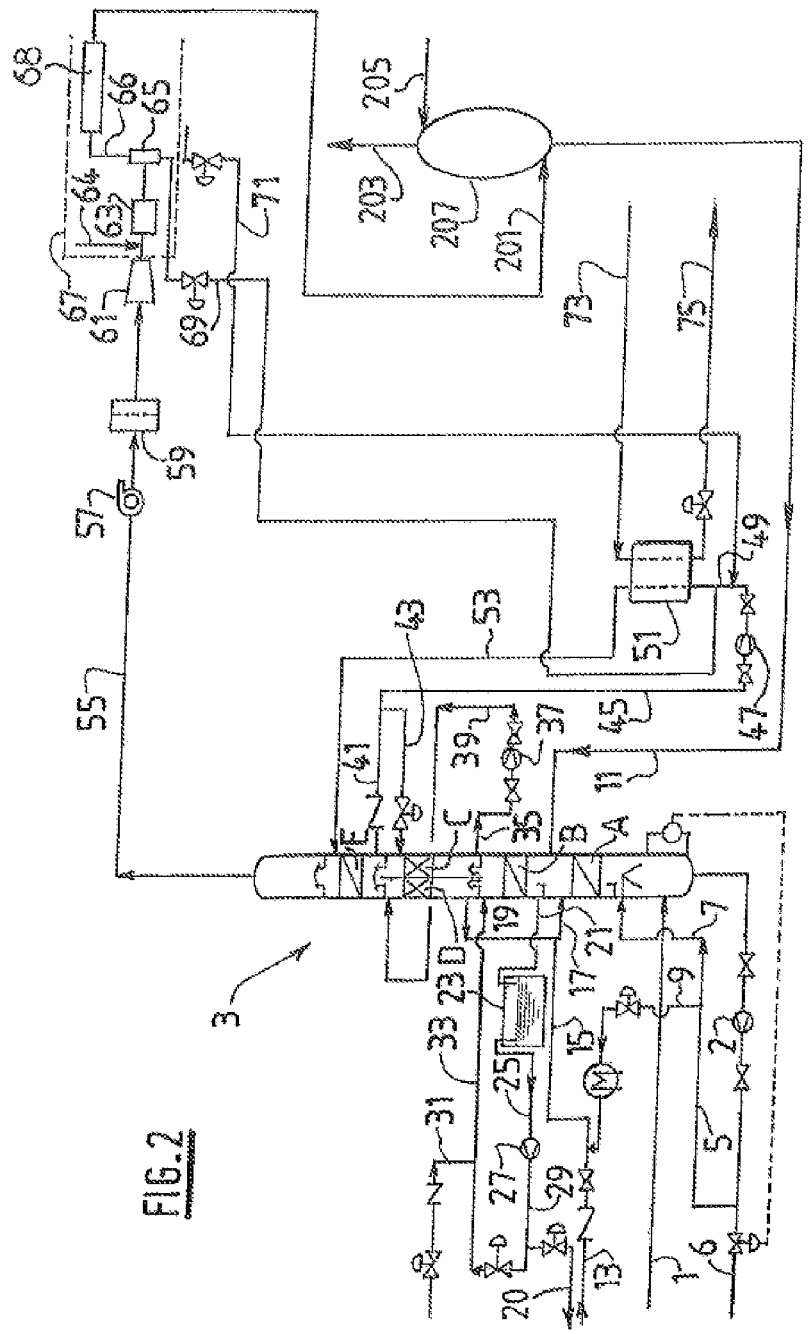

In FIG. 2, a $CO_2$-rich and wet fluid 1 is sent to a scrubbing column 3 operating at a pressure of less than 10 bar, preferably at atmospheric pressure. The fluid is first wetted by a water supply 7. The water is extracted at the bottom of the column 3, pumped by a pump 2 and split in two. One portion 6 is used as a purge and the remainder 5 is split in two to form the water 7 added to the column 3 and a flow 9 mixed with a possible water supply 13. The mixture formed is used to cool the fluid in section A of the column by scrubbing with water. A make-up of basic agent 31 is added to the flow of water 33 which scrubs the fluid in the section B. The flow 33 is formed by a cycle comprising the line 21 connected to the column below section B, a tank 23, lines 25 and 29 and a pump 27. The loop is purged via the fluid 20. This scrubbing in section B is optional and is used to remove the $SO_x$ present in the fluid 1 or other strong acids that would not be stopped by simple contacting with water in the lower sections.

Sections C, D and E are used to carry out the cooling of the $CO_2$-rich gas and the recovery of the antifreeze, in this case methanol. A flow of water mixed with around 20% of methanol is sent to the top of column 3 at a temperature of −15° C. via the line 53. This flow cools the gas rising in section E and a water-enriched liquid accumulates below this section. This liquid 41 is withdrawn and split in two. One portion 43 is sent back to the top of section C which forms a packing section having a semicircular cross section separated from another section D having a semicircular cross section by a partition. The partition may also separate the two sections into two concentric zones. All the liquid sent back to the column is sent to section C rather than to section D in order to ensure a high rate of reflux in section C. The liquid that has descended through section C is collected in line 35, pumped by the pump 37 and sent back to the top of section D. The liquid 19 formed below section D is sent to the top of section A and comprises mostly water. The remainder of the liquid extracted from section E is discharged via the pipe 45 then pumped by the pump 47 in order to form the flow 49 added to which was the make-up of antifreeze 71 and the return of the antifreeze-containing condensates from the downstream part of the process. The fluid 49 is cooled in the exchanger 51 by means of a flow of liquid $CO_2$ 73 originating from a unit for purifying the gas 55 produced at the top of the column 3. The liquid 73 leaves the exchanger 51 as fluid 75. The cooled liquid 53 is sent to the top of section E. A gas 55 containing around 1500 ppm of water exits from the top of the column 3, is compressed in a compressor 57 made of carbon steel or low-alloy steel, purified by a fine purification step 59 as in the prior art (filtered), the filtration members may also be formed from carbon steel or low-alloy steel, and then the gas is compressed in a compressor 61 made of carbon steel or low-alloy steel. Following next are possibly an optional purification of the $CO_2$-rich gas of its light constituents (oxygen, argon, hydrogen, carbon monoxide, nitrogen, etc.) and/or of its heavier constituents ($NO_2$, $N_2O_4$, $SO_2$, methanol, water, etc.), the possible variants of this step are described at length in previous patent applications and possibly a step of compression of the $CO_2$-rich final product or of liquefaction of the $CO_2$-rich final product in order to make it available to a system of transport (by pipeline or boat) or for its use in a process. In the figure, the gas is cooled in an exchanger 63 and separated in a phase separator 65. The gaseous portion 66 is purified and the liquid portion 69, containing methanol and water, is sent back to the exchanger 51. A make-up flow of methanol 71 is also added upstream of the exchanger 51 to compensate for the losses of antifreeze via the liquid purges of the column 3 and in the gas 66.

A methanol-containing purge flow of $NO_2$ 11 is sent to above section A and below section B. This flow originates from a carbon dioxide purification unit located downstream of the phase separation pot 65.

Figure 3:
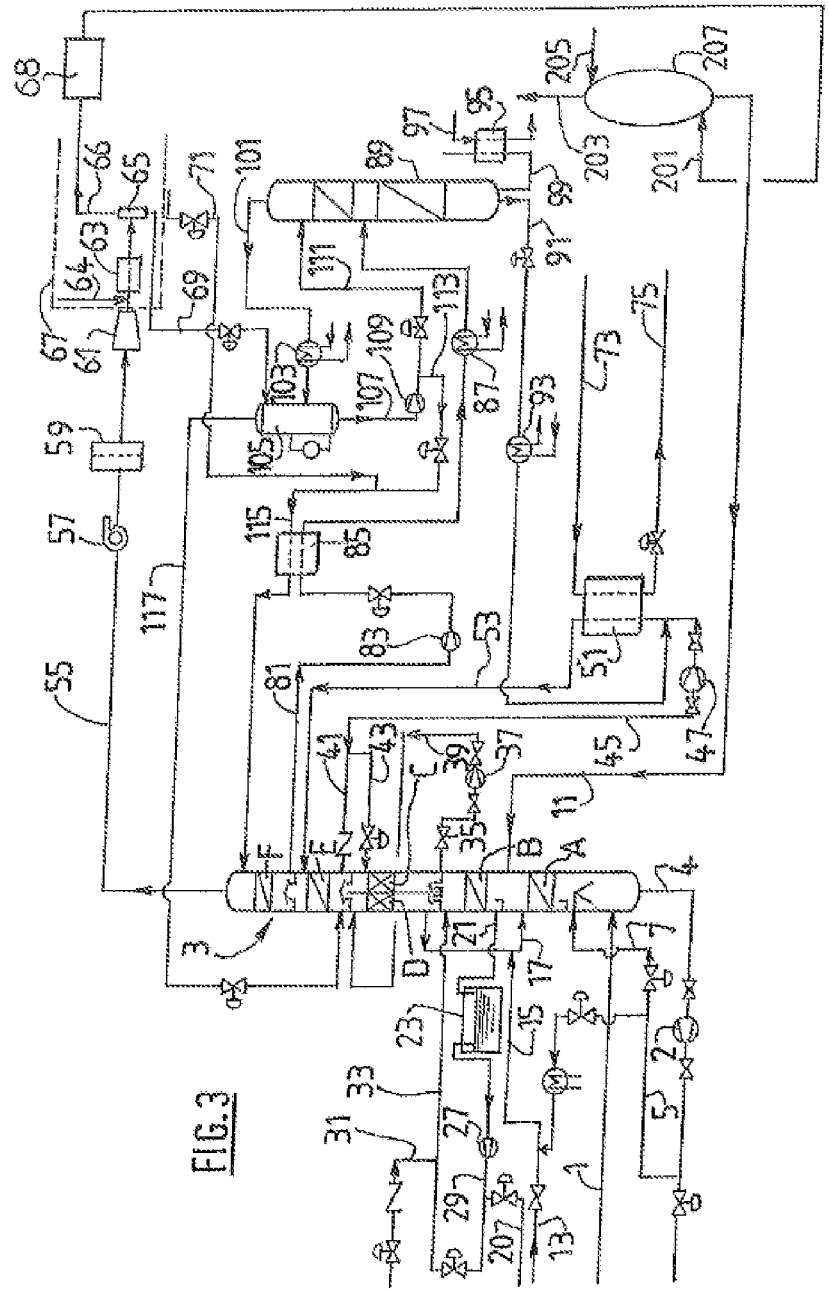

FIG. 3 illustrates a process according to the invention capable of producing a $CO_2$-rich fluid that is drier than the one from FIG. 2.

A $CO_2$-rich and wet fluid 1 is sent to a scrubbing column 3 operating at a pressure of less than 10 bar, preferably at atmospheric pressure. The fluid is first wetted by a water supply 7. The water is extracted at the bottom of the column 3, pumped by a pump 2 and split in two. One portion 6 is used as a purge and the remainder 5 is split in two to form the water 7 added to the column 3 and a flow 9 mixed with a possible water supply 13. The mixture formed is used to cool the fluid in section A of the column by contacting with water. A make-up of basic agent 31 is added to the flow of water 33 which scrubs the fluid in the section B. The flow 33 is formed by a cycle comprising the line 21 connected to the column below section B, a tank 23, a line 25 and a pump 27. The loop is purged via the fluid 20. This scrubbing in section B is optional and is used to remove the $SO_x$ present in the fluid 1 or other strong acids that would not be stopped by simple contacting with water in the lower sections. Sections C, D, E and F are used to carry out the scrubbing with the antifreeze, in this case methanol. A flow 80 of around 99% of methanol mixed with a little water is sent to the top of column 3 at a temperature of around −15° C. This flow scrubs the gas rising in section F and a water-enriched liquid accumulates below this section. In this section F, the water from the gas is absorbed into the methanol-rich scrubbing flow. This liquid 81 is withdrawn, pumped by the pump 83, cooled in the exchanger 85, warmed in the exchanger 87 and sent to an intermediate point of a purification column 89 functioning as a distillation column. The column 89 comprises a reboiler 95 and an overhead condenser 103. The bottoms liquid 99 is heated by means of a flow of water vapor (or of hot water) 97 in the reboiler 95 and sent back to the column 89. The overhead gas 101 partially condenses in the condenser 103 to form a gas 117 and a liquid 107 separated in a phase separator 105. The liquid 107 is partly sent back to the column 89 as reflux liquid 111 and the remainder 113 is sent to the exchanger 85, mixed with a make-up of methanol 71 that compensates for the losses of methanol from the system. Next, the flow 115 formed is sent to the top of the scrubbing column 3 in two.

The overhead gas 117 is sent to below section E.

The bottoms liquid 91 from the distillation column containing water and methanol is cooled a first time in the exchanger 93 against the cooling water, then in the exchanger 51 against the carbon dioxide 73 and sent back to the top of section E.

A portion 43 of the liquid taken from below section E is sent back to the top of section C which forms a packing section having a semicircular cross section separated from another section D having a semicircular cross section by a partition. The partition may also separate the two sections into two concentric zones. All the liquid sent back to the column is sent to section C rather than to section D in order to ensure a high rate of reflux in section C. Water with methanol 45 is pumped by the pump 47 in order to form the flow 49 and cooled in the exchanger 51 by means of a flow of liquid $CO_2$ 73 originating from a unit for purifying the gas 55 produced at the top of column 3 thus producing warmed carbon dioxide 75. The cooled liquid 53 produced by mixing the flows 45 and 91 is sent to the top of section E. The liquid that has descended through section C is collected in line 35, pumped by the pump 37 and sent back to the top of section D. The liquid 19 formed below section D is sent to the top of section A and comprises mostly water. A gas 55 containing around 1 ppm of water exits from the top of the column 3, is compressed in a compressor 57, purified by a fine purification step 59 as in the prior art (filtered) and then the gas is compressed in a compressor 61 made of carbon steel or low-alloy steel. Following next are possibly an optional purification of the $CO_2$-rich gas of its light constituents (oxygen, argon, hydrogen, carbon monoxide, nitrogen, etc.) and/or of its heavier constituents (NO$_2$, N$_2$O$_4$, SO$_2$, methanol, etc.), the possible variants of this step are described at length in previous patent applications and possibly a step of compression of the CO$_2$-rich final product or of liquefaction of the CO$_2$-rich final product in order to make it available to a system of transport (by pipeline or boat) or for its use in a process. In the figure, the gas is cooled in an exchanger 63 and separated in a phase separator 65. The gaseous portion 66 is purified and the liquid portion 69, containing methanol and water, is sent back to the phase separator 105.

In order to regulate the amount of methanol sent to the scrubbing column 3, the reboiling rate of the reboiler 95 may be modified as a function of the methanol content measured for one flow of the system, in particular the flow 115, the flow 53, the flow 81 or the flow 41.

The methanol loop formed by the flow 81 and the flow 113 must be purified in order to remove the water drawn off in section F from the CO$_2$-rich gas but also the optional other impurities that could accumulate in the loop (H$_2$S, O$_2$, CO$_2$, HCl, etc.). There are several ways of purifying the methanol loop:

1) Degassing of methanol from the water purge using the feed gas (FIG. 3)
    1-1→The methanol degassing system is integrated into the cooling tower of the feed flow, which also serves to remove the SOx and/or NOx.
    In this way, no additional blower is required, the temperature of the degassing gas is lowered owing to the increased flow and only one tower may be used for combining the functions of cooling (section A), purification of NOx-SOx (section B), degassing of methanol, (sections C and D), cooling for lowering the dew point (section E) and scrubbing with methanol for reducing water to the level of ppm (section F).
    1-2→Owing to the very low ratio between the liquid and the gas when all the feed gas is used to degas the water purge, the following elements may be used to establish mass and heat exchange between the gas and the liquid:
        distillation plates
        gauze packings
        parallel sections for the gas with the liquid flowing in series from one section to another.
2) Scrubbing of the gas with liquid CO$_2$ in a cold box
3) Adsorbants (all sorts: zeolite, activated carbon, etc.) on purges of gas or liquid
4) Membrane on purge or liquid circuit
5) Rapid expansion of liquid under vacuum
6) Pervaporation (membrane system used in a different way for the separation of alcohol and water into liquid phases.

After the compressor 68 from FIGS. 2 and 3, during the condensation of the methanol-containing CO$_2$-rich gas, the heaviest compounds will be concentrated in the first droplets of condensation. If the gas treated contains NOx, NO will be at least partially oxidized to NO$_2$ or N$_2$O$_4$ with the oxygen from the gas. Since the oxidation reaction is accelerated during a rise of the pressure and a lowering of the temperature, NO$_2$ will be present in the first droplets of condensation if there are NOx in the gas treated. The methanol will also condense from the first droplets onwards.

It is known that methanol and NOx may react according to multiple mechanisms, both in the gas phase and in the liquid phase, certain reactions involving water and/or nitric acid, others only methanol and NO$_2$. The compounds thus formed may be reactive.

Mention may especially be made of the following reactions:

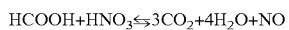

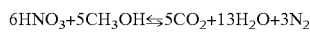

One way of limiting the impact of these reactions is to dilute the nitrogen oxides in the first droplets of condensation. To do this, it is possible to inject at 64 upstream of the exchanger 63 in the figures, water or methanol or liquid CO$_2$ in a sufficient amount to reduce the content of NOx in the liquid phases.

Each dilution solution has its drawbacks (losses of "noble" product such as methanol, refrigeration losses in the event of the contacting of liquid CO$_2$ (around -20° C. in our example where the stream is treated at 20 bar) with a gas at 5° C., risks of corrosion in the event of addition of water, etc.).

The feed gas 55, after the cooling step in column 3 and a first compression with the compressor 61, may be introduced into the cold box 67 and cooled in the exchangers 63 and 67. There may be a first partial condensation pot 65 where a large part of the methanol, and water if any remains, is condensed and recycled to the low-pressure column as fluid 69.

After the exchanger 67, the cooled gas 201 will be scrubbed of traces of methanol, water and NOx optionally, and also of any other compound heavier than CO$_2$ in a packed column 207. The gas 201 is introduced at the bottom and pure liquid CO$_2$ 205 (i.e. which is purified of heavy compounds) is injected to provide the reflux at the top of the column. The bottoms liquid 11 from column 207 is recycled to column 3 between sections A and B in order to recover the methanol therein, the water will be purged as described previously. It is also possible to envisage neutralizing the NOx therein with a basic solution (section B).

Note that upstream of the first condensation in the separator pot 65, it is possible to inject a fluid in order to dilute the NOx in the liquid phases. This dilution fluid 64 may be water, liquid CO$_2$ or methanol.

The condensates 69 optionally laden with "NOx+methanol" reaction products may be recycled to the scrubbing tower 3, the NO$_2$ will be able to react with the water present and form nitric acid which could be neutralized in the optional section B, the methanol will be able to be degassed by the CO$_2$-rich gas rising from section A and thus be recycled into the process. Another way of generating these condensates is to incinerate them in the boiler, which increases the methanol make-up requirement but limits the risks posed by the recycling of the "NOx+methanol" reaction products.

It will be understood that many additional changes in the details, materials, steps and arrangement of parts, which have been herein described in order to explain the nature of the invention may be made by those skilled in the art within the principle and scope of the invention as expressed in the appended claims. Thus, the present invention is not intended to be limited to the specific embodiments in the examples given above.

What is claimed is:

1. A process for compressing a water-containing CO$_2$-rich fluid, the process comprising the steps of:
   introducing the water containing CO$_2$ rich fluid to a scrubbing column that is also fed at the top of the scrubbing column by a first mixture of water and antifreeze under conditions effective for removing water from the water containing $CO_2$ rich fluid within the scrubbing column thereby producing a water-depleted cooled fluid at the top of the scrubbing column;

extracting the water-depleted cooled fluid from the top of the scrubbing column;

compressing the water-depleted cooled fluid in a compressor to produce a $CO_2$-rich fluid;

cooling the $CO_2$-rich fluid in a purification unit;

extracting a second mixture of water and antifreeze at an intermediate location of the scrubbing column that is below the top of the scrubbing column;

cooling the second mixture of water and antifreeze using a flow of liquid $CO_2$ originating from the purification unit to produce the first mixture of water and antifreeze that is then fed back to the top of the scrubbing column.

2. The process of claim 1, wherein the compressor is made of carbon steel or low-alloy steel.

3. The process of claim 1, wherein, downstream of the compressor, the CO2-rich fluid is separated at a temperature below the solidification point of water (0° C.), without having dried the fluid by adsorption upstream.

4. The process of claim 1, wherein the content of water and/or of other impurities of the second mixture of water and antifreeze extracted from the scrubbing column is reduced, before sending the mixture back to the top of the column.

5. The process of claim 1, wherein the second mixture of water and antifreeze is purified by distillation in a purification column having a bottom reboiler, a liquid containing water and antifreeze is extracted from the bottom of the purification column and a rate of reboiling is adjusted as a function of the content of antifreeze in the first mixture of water and antifreeze feeding a cooling section of the scrubbing column or in the liquid extracted at the bottom of the purification column.

6. The process of claim 1, wherein the second mixture of water and antifreeze is purified by adsorption or by permeation or pervaporation or vacuum drawing.

7. The process of claim 1, wherein the second mixture of water and antifreeze is cooled using refrigeration originating from the purification unit by using, at least one of the following steps:

i) vaporization of $CO_2$ originating from a second compressor for producing $CO_2$ treated by the purification unit;

ii) production of refrigeration by a refrigeration unit that cools the $CO_2$-rich fluid or the water-depleted cooled fluid or a fluid derived from one of these fluids or a fluid from which one of these fluids is derived; and/or iii) use of refrigeration produced by the expansion of the water-depleted cooled fluid.

8. A unit for compressing a water-containing $CO_2$-rich fluid, the unit comprising:

a scrubbing column configured to scrub the water-containing $CO_2$-rich fluid under conditions effective to produce a water-depleted $CO_2$-rich fluid at a top of the scrubbing column and a water-rich liquid at a bottom of the scrubbing column;

a first inlet line configured to introduce a first mixture of antifreeze and water to an upper level of the scrubbing column;

a second inlet line configured to introduce the water-containing $CO_2$-rich fluid to a lower level of the scrubbing column;

a first outlet line configured to withdraw water from the bottom of the scrubbing column;

a second outlet line configured to withdraw a second mixture of water and antifreeze from the scrubbing column, the second line connected to an intermediate level of the scrubbing column that is below the top of the scrubbing column;

a heat exchanger in fluid communication with the second outlet line and the first inlet line, such that the heat exchanger is configured to receive the second mixture of water and antifreeze from the scrubbing column, wherein the heat exchanger is configured to cool the second mixture of water and antifreeze and return the resulting cooled stream to the first inlet line as the first mixture of antifreeze and water;

a compressor in fluid communication with the top of the scrubbing column, wherein the compressor is configured to receive the water-depleted $CO_2$-rich fluid from the top of the scrubbing column; and a purification unit in fluid communication with the compressor, such that the purification unit is configured to cool the $CO_2$-rich fluid received from the compressor;

wherein the heat exchanger is in fluid communication with the purification unit, such that the heat exchanger is configured to receive a flow of liquid CO2 originating from the purification unit to provide the cooling energy for cooling the second mixture of water and antifreeze.

9. The unit of claim 8, comprising a purification means, other than the scrubbing column, connected to the second outlet line configured to withdraw a second mixture of water and antifreeze from the scrubbing colum and the first inlet line configured to introduce a first mixture of antifreeze and water to an upper level of the scrubbing column.

10. The unit of claim 8, wherein the compressor is made of carbon steel or low-alloy steel.

11. The unit of claim 8, comprising a means for vaporizing $CO_2$ originating from a second compressor for producing $CO_2$ treated in the purification unit that are suitable for transferring refrigeration to the heat exchanger in order to cool the second mixture of water and antifreeze.

12. The unit of claim 8, comprising a refrigeration unit configured to cool the $CO_2$-rich fluid or the water-depleted cooled fluid or a fluid derived from one of these fluids or a fluid from which one of these fluids is derived and capable of cooling the second mixture of water and antifreeze.

13. The unit of claim 8, comprising a means for expanding the water-depleted cooled fluid and means for transferring refrigeration from the means for expanding the cooled fluid to the means for cooling the mixture.

* * * * *